United States Patent [19]

Kunz et al.

[11] Patent Number: 5,348,659
[45] Date of Patent: Sep. 20, 1994

[54] COUNTERCURRENT REGENERATION PROCESS

[75] Inventors: Gerhard Kunz, Heiligenhaus, Fed. Rep. of Germany; George L. Dimotsis, Lansdale, Pa.; Richard L. Sampson, Trumbull, Conn.

[73] Assignee: EDR Acquisition Corp., Plantsville, Conn.

[21] Appl. No.: 853,272

[22] Filed: Mar. 18, 1992

[51] Int. Cl.$^5$ .............................................. C02F 1/42
[52] U.S. Cl. ........................................ 210/678; 521/26
[58] Field of Search ............... 210/670, 678, 687; 521/26

[56] References Cited

U.S. PATENT DOCUMENTS

| | | | |
|---|---|---|---|
| 3,021,276 | 2/1962 | Mast | 210/35 |
| 4,181,605 | 1/1980 | Braswell | 210/191 |
| 4,184,893 | 1/1980 | Halvorsen et al. | 521/26 |
| 4,202,737 | 5/1980 | Shimizu | 521/26 |
| 4,379,057 | 4/1983 | Meiser et al. | 210/678 |
| 4,385,992 | 5/1983 | Clauer et al. | 210/678 |
| 5,108,616 | 4/1992 | Kunz | 210/678 |
| 5,114,595 | 5/1992 | Hensley | 210/792 |

FOREIGN PATENT DOCUMENTS

| | | |
|---|---|---|
| 1442389 | 10/1968 | Fed. Rep. of Germany . |
| 3528800 | 2/1987 | Fed. Rep. of Germany . |
| 1352176 | 5/1964 | France . |
| 0165831 | 12/1985 | France . |
| 61-12490 | 4/1986 | Japan . |
| 894669 | 5/1990 | South Africa . |
| 1539161 | 1/1979 | United Kingdom . |

OTHER PUBLICATIONS

English translation of French Pat. No. 1,352,176.
English translation of German Pat. No. DE 3528800 A1.

*Primary Examiner*—Ivars Cintins
*Attorney, Agent, or Firm*—Cumpston & Shaw

[57] ABSTRACT

A method of regenerating an ion exchanger which is used to treat a solution introduced to the ion exchanger in a downward charging direction. The ion exchanger comprises a non-constrained bed of ion exchange material in the form of ion exchange granules and has a concentration profile through the ion exchange material after the solution has been introduced to the ion exchanger in the charging direction. The method in one embodiment comprises passing a regenerating solution upwardly through the non-constrained bed of ion exchange material in an intermittent pulsed flow comprising a pulse or up flow of regenerating solution, a subsequent non-flow pause time, followed by a down flow pulse in a direction opposite to the up flow. The duration and velocity of the pulse or up flow of regenerating solution is sufficient to hydrodynamically lift the ion exchange granules a controlled distance through all of the ion exchange granules without causing significant mixing of ion exchange granules between different layers of the ion exchange material. The duration of the subsequent non-flow pause time being of short duration to allow for some perceptible settling of the ion exchange granules, with the down flow pulse being sufficient to reduce the sedimentation time of the ion exchange granules to a fraction of the normal settling time for the granules in the absence of the down flow pulse.

12 Claims, 4 Drawing Sheets

COUNTERCURRENT REGENERATION PROCESS

BACKGROUND OF THE INVENTION

The present invention relates to an improved process for regenerating ion exchange materials, and more specifically, to a process for carrying this out using a countercurrent technique.

A recently allowed U.S. patent application Ser. No. 07/369,238 to Gerhard K. Kunz filed Jun. 22, 1989 entitled PROCESS AND APPARATUS FOR ION EXCHANGERS, PARTICULARLY FOR REGENERATION AFTER SOFTENING AND DEMINERALIZATION OF AQUEOUS SOLUTIONS which describes the Kunz countercurrent regeneration process is incorporated herein by reference. A Kunz counterpart application has issued in the Republic of South Africa as 89/4669 and is also incorporated herein by reference. The Kunz countercurrent regeneration process describes the regeneration of a non constrained bed of ion exchange materials in a countercurrent fashion by admitting the regenerating solution using alternating pulse flow and non flow conditions. During the non flow period, the bed of ion exchange material which is lifted during the up flow pulse period is allowed to settle. In this process, the pulse flow velocities and volumes, and the settle times (non flow period) between pulses are carefully defined. This process is currently being successfully employed commercially under the tradename Impulse TM by Impulse Regeneration Services of Hatboro, Pa. for the regeneration of water softeners, a process during which the regeneration uses a solution of NaCl to remove divalent cations from cation exchange materials.

The use of the Kunz countercurrent process for demineralization requires the regeneration of cation exchange materials back to the hydrogen form and anion exchange materials back to the hydroxide forth. Regeneration of commercially available cation exchange material with a mineral acid such as HCl proceeds very much as the cation regeneration with solutions of NaCl. Regeneration of commercially available anion exchange materials however can only be accomplished by a significant increase in the settle time between pulses.

In the Kunz process, the density difference between the ion exchange material and the regenerating solution is the major factor that determines the settle time that is required between pulses to insure essentially complete resettling of the bed. As taught by Kunz, essentially complete resettling of the bed is necessary to ensure optimum regeneration efficiencies. The smaller the difference in the densities between the ion exchange material and regenerating solution, the greater the settle time required in the Kunz process to settle the ion exchange materials back to essentially their initial position. In the case of softening, typical density differences using commercially available cation resins and typical regenerating salt solutions are in the range of 0.13 g/cm$^3$ to 0.17 g/cm$^3$. For example, as practiced commercially, the Kunz process used to regenerate a softener has a settle time of 15 seconds. Total regeneration time as commercially practiced requires 4 to 5 hours.

The regeneration of commercially available anion exchange materials involves significantly smaller density differences, typically 0.05 g/cm$^3$ to 0.08 g/cm$^3$ between normally used anion exchange materials and their regeneration solutions. Experimental use of the Kunz process for regenerating such anion resins results in extended settle times in order to achieve essentially complete re-settling of the bed. Settle times in the order of 45 seconds have been observed resulting in a total regeneration time in excess of 7 hours. Thus, although the Kunz regeneration process can be made to work with both the cation and the anion exchange materials required for demineralization, the total regeneration time of this process becomes quite long, thereby reducing its commercial viability.

It has now been discovered that the Kunz process may be improved by significantly reducing the settle time between pulses by using a down flow pulse (or down flow) of liquid in the opposite direction to the up flow or pulse. This reduction in settle time dramatically reduces the total time required for regeneration under the Kunz process while maintaining the basic regeneration chemical utilization advantages of the Kunz process.

SUMMARY OF THE INVENTION

The present invention is directed to an improved countercurrent ion exchange regeneration process. The invention improves the recently patented Kunz process by reducing the overall time for the regeneration of an ion exchanger while maintaining the basic regeneration chemical utilization advantage of the original Kunz process.

In the present invention, an upflow pulse of duration and volume, according to Kunz, is employed to introduce the regenerating chemical in an upward direction sufficient to hydrodynamically lift the bed a controlled distance without causing mixing of the ion exchange materials. In one embodiment of the present invention, this up flow pulse is followed by a down flow pulse (or down flow) to initiate bed settling followed by a no flow settle time to complete bed settling to the degree required by Kunz. The cycle is then repeated with the introduction of another up flow pulse. In a further embodiment of the present invention the up flow pulse is followed by a no flow settle time to start bed settling which, in turn, is followed by a down flow pulse (or down flow) to complete bed settling to the extent required. The cycle is then repeated with the introduction of another up flow pulse. In both these embodiments of the present invention, the down flow pulse (or down flow) enters into the top of the vessel, through the top of the ion exchange bed, and is then discharged through a distributor in the bottom of the vessel. Alternatively, in yet further embodiments of the present invention, the down flow pulse (or down flow) can be incorporated into either of the two protocols described above but may then exit through a collector buried about 3 to 6 inches into the resin bed rather than through a distributor in the bottom of the vessel.

DETAILED DESCRIPTION OF THE INVENTION

Figure 1:
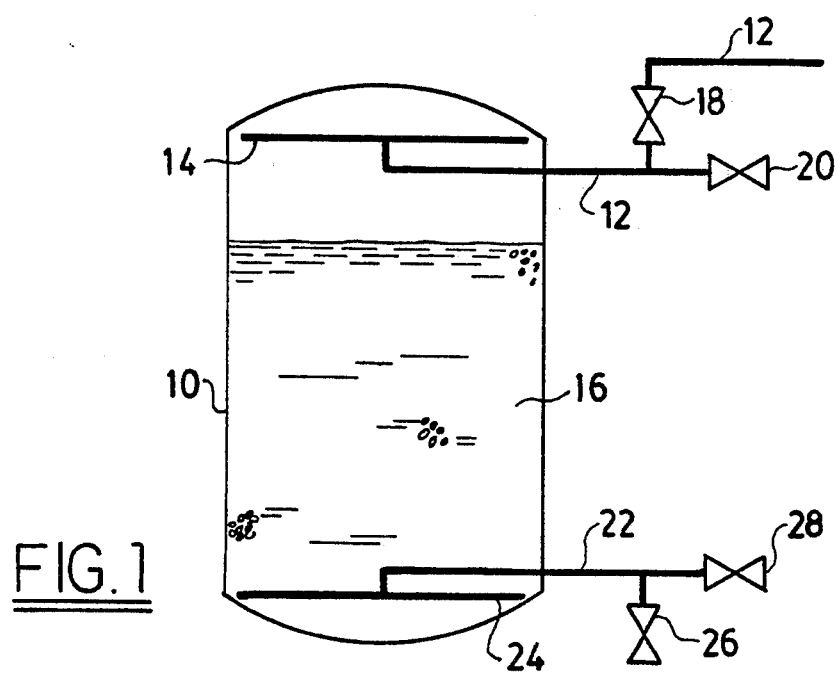
FIG. 1 is a schematic illustration of an ion exchange vessel suitable for use in carrying out one embodiment of the present invention.

In older to understand the present invention, the following basic description of the Kunz process must be considered.

In accordance with the process covered by the Kunz invention, a non constrained bed of ion exchange material, charged by downward flow, is first treated with regenerant and then with rinse solution, feeding these solutions through the ion exchange materials in a direction opposite or countercurrent to the charging direction. This feed of both the regenerant and then the rinse solution is conducted in an upward flow such that the exchange materials or beads are loosened, but no mixing or rearrangement of the layers occurs in the flow direction, and the regenerant and rinse solutions are then discharged above the ion exchange bed.

The exchange materials are loosened but not mixed or rearranged in accordance with Kunz by a process consisting of a short pulse flow followed by a subsequent settle time during which there is no flow of liquid. During the pulse flow there is hydrodynamic lifting of the ion exchange materials or beads and during the pause or settle time the materials are permitted to resettle to essentially their original position. Preferably, the pulse flow is designed to permit lifting of the exchange material but to no more than ten times the greatest grain diameter of said ion exchange materials; however, greater lifting may be permitted depending on the characteristics of the ion exchanger. The pause or settle time following each pulse flow lasts until substantially complete sedimentation of the ion exchange materials lifted during the pulse flow has occurred. Only after substantially complete sedimentation is the ion exchanger again subjected to the pulse flow of the next pulse interval.

Typically, the pulse time is quite short and should not exceed three to four seconds. For a pulse volume that moves the ion exchange bed no more than approximately ten bead diameters, the pulse time should preferably not exceed two seconds. In such a system, the pause time or bed settling time should not exceed about forty seconds. However, longer settle times are still in accordance with the Kunz invention since longer times do not detract from the technical advantages of the Kunz invention, but do extend the overall time for the regeneration and rinsing cycles. The essential teaching of the Kunz process is to insure that the bed remains non mixed during the entire series of regeneration flow and settle times to insure achieving optimum countercurrent efficiencies. The Kunz process advantages lie in achieving a high degree of regeneration chemical utilization while overcoming many of the problems of the prior art.

While achieving significant economic advantages, the reliance by Kunz on gravitational settling limits the practical application of this process. The present invention overcomes the shortcoming of this process by accelerating sedimentation without violating the other critical teachings of the Kunz patent. This leads to significantly reduced overall regeneration times while still maintaining the regenerating chemical utilization advantages of the basic Kunz process.

FIG. 1 illustrates an ion exchange vessel 10 with hardware suitable for carrying out one embodiment of the present invention. The vessel 10 contains an upper distribution system which consists of piping 12 connected to a distributor 14 having a plurality of openings or ports (not shown) for providing a flow of fluid to the resin bed 16. The distributor 14 is operably connected via piping 12 to valves 18 and 20 at the top of the vessel 10. Vessel 10 further contains a lower distribution system which consists of piping 22 and distributor 24 equivalent to that of the upper distribution system and is operably connected via piping 22 to valves 28 and 26, respectively. A non-constrained bed of ion exchange materials 16 is contained within vessel 10.

In carrying out the process of the present invention it should be understood that any conventional apparatus, hardware and/or control mechanisms which are available in the art may be used. For example, suitable plumbing, discharge devices, distributors, collectors, and related valves and control mechanisms which may be used to run and monitor the process of this invention, are taught by the Kunz U.S. application and Kunz counterpart South African patent, U.S. Pat. Nos. 4,181,605, 4,184,893 and 4,202,737, German Patent 1,352,176 to Degremont; and German Patent Publication DE 35 28 800 AL published Feb. 12, 1987 to Eumann, all of which are exemplary of the prior art, and all of which are incorporated herein by reference.

Operation of an ion exchange vessel for a typical water softening process according to one embodiment of the present invention (using the up flow, settle, down flow protocol with the down flow exiting through the bottom of the bed) proceeds as follows:

During the exhaustion cycle, water containing hardness (Ca and Mg) ions passes through valve 20 into the vessel 10 through distributor 14, through the resin bed 16, down through the lower distributor 24 and out the vessel through piping 22 and through valve 28. When exhaustion is complete, valves 20 and 28 are closed. A flow of regenerating brine is introduced through valve 26, through distributor 24 upwardly through the bed 16, through distributor 14 and out through piping 12, and through valve 18. This flow is preferably designed to permit a lifting height of no more than ten times the greatest grain diameter of the ion exchange resin, according to Kunz. Valves 26 and 18 are then closed and a pause or settle time proceeds until some settling of the bed has occurred. A down flow pulse (or down flow) is then generated by opening valves 20 and 26 to provide sufficient force to the bed to return it to substantially its initial position. Regenerating chemical displaced through valve 26 is then reintroduced, along with fresh regenerating chemical in the next up flow. The cycle is repeated until the required quantity of regenerating chemical has been introduced into the system. The cycle is then repeated with the up flow consisting of rinse water until the remaining regenerant and displaced ions have been removed from the vessel. After completion of the rinse, the unit can then be placed back into service to be exhausted.

Figure 2A:
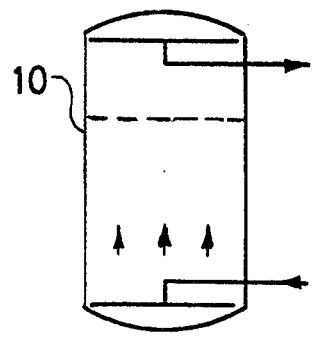
FIGS. 2A, 2B and 2C schematically illustrate a further embodiment of the present invention in the form of flow diagrams using the up flow, settle, down flow protocol.

FIG. 2A depicts the flow directions during the up flow or pulse as described in FIG. 1 above. The regenerating chemical and rinse streams are fed in pulses which proceed into the vessel through the distributor at the bottom of the vessel, up through the non-constrained resin bed, out through the top of the resin bed, and through the distribution piping at the top of the system.

Figure 2B:
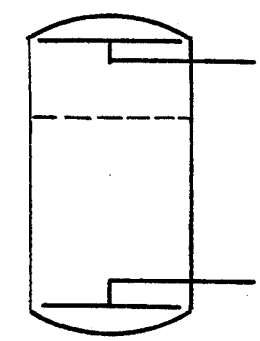

FIG. 2B illustrates the non flow period during this process.

Figure 2C:
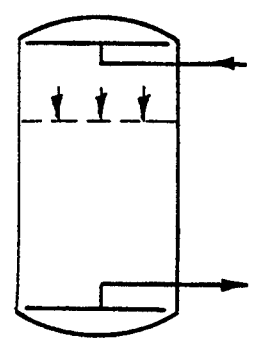

FIG. 2C depicts the flow direction during the down flow pulse (or down flow) as described for FIG. 1 above. The bed is forced to return to substantially its original position by a flow of liquid which enters the top of the vessel through the distributor at the top of the vessel, proceeds down through the top of the resin bed, through the resin bed, and through the distributor at the bottom of the vessel. The flow direction in FIGS. 2A and 2C is illustrated by the arrows.

Figure 2D:
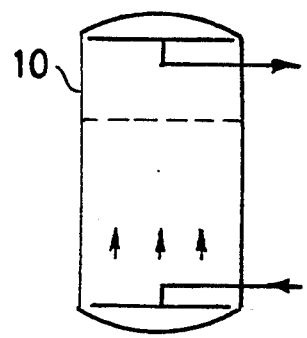
FIGS. 2D, 2E and 2F illustrate a further embodiment of the present invention in the form of flow diagrams using the up flow, down flow, settle protocol.
Figure 2E:
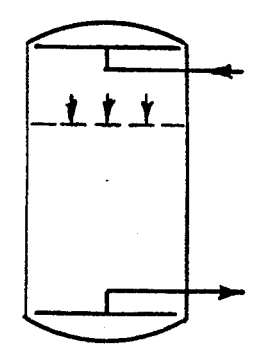
Figure 2F:
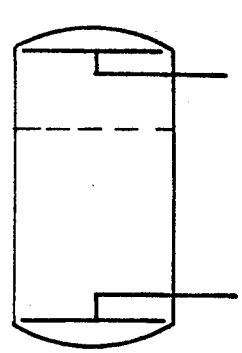

FIGS. 2D, 2E and 2F illustrate an alternative embodiment of the invention in which the sequence of the process is up flow, down flow and settle.

Figure 3:
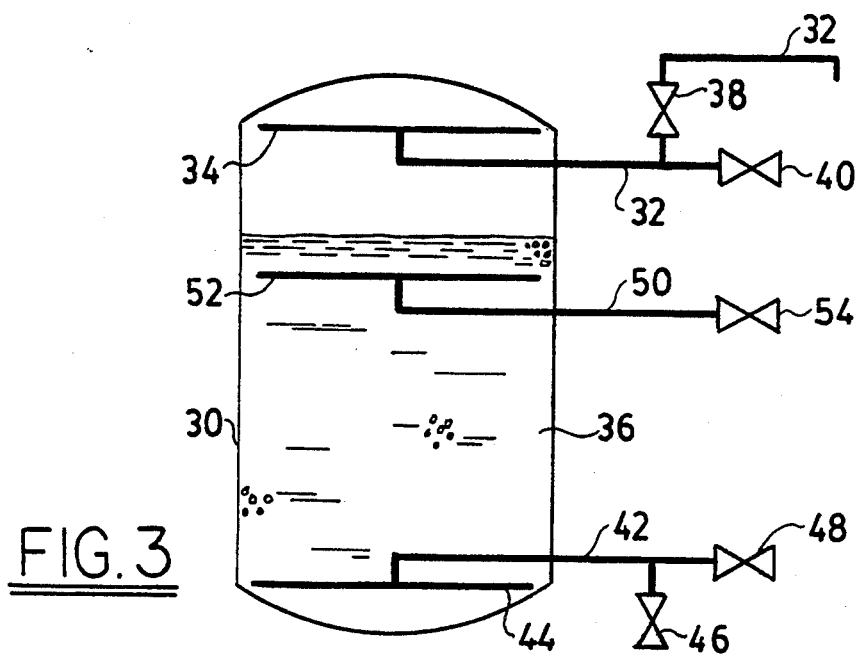
FIG. 3 is a schematic illustration of a second ion exchange vessel suitable for use in carrying out the process of the present invent ion.

FIG. 3 illustrates an ion exchange vessel 30 with hardware suitable for carrying out a second embodiment of the present invention. The vessel contains an upper distribution system which consists of piping 32 connected to a distributor 34 having a plurality of openings or points (not shown) for providing a flow of fluid to the resin bed 36. The distributor 34 is connected via a pipe 32 to valves 38 and 40 at the top of the vessel 30. Vessel 30 contains a lower distribution system equivalent to that of the upper distribution system which consists of piping 42 and distributor 44 which is connected via pipe 42 to valves 46 and 48, respectively. An ion exchange resin bed 36 is contained within vessel 30. Vessel 30 further contains a collector 52 operably connected to piping 50 and valve 54 located approximately 3 to 6 inches below the top surface of the resin bed.

Operation of an ion exchange vessel for a typical water softening process according to this second embodiment of the present invention (using the up flow, settle, down flow protocol with the down flow exiting through a collector) proceeds as follows:

During the exhaustion cycle, water containing hardness (Ca and Mg) ions passes through valve 40 into the vessel 30 through piping 32 through distributor 34, through the resin bed 36, down through the lower distributor 44, and out the vessel through piping 42 through valve 48. When exhaustion is complete, valves 48 and 40 are closed. A pulse flow of regenerating brine is introduced through valve 46 through piping 42 and distributor 44 upwardly through the bed 36 and out through valve 38 by way of distributor 34 and piping 32. This pulse flow is preferably designed to permit a lifting height of no more than ten times the greatest grain diameter of the ion exchange resin, according to Kunz. Valves 38, and 46 are then closed and a pause or settle time proceeds until some settling of the bed has occurred. A down flow pulse (or down flow) is then generated by opening valves 40 and 54 to provide sufficient force to the bed to return it to substantially its initial position. This down flow pulse (or down flow) proceeds through valve 40, piping 32, the upper distributor 34, through the top 3 to 6 inches of the ion exchange bed and exits the vessel through valve 54 via the collector 52 and connecting piping 50. The cycle is repeated until the required quantity of regenerating chemical has been introduced into the system and then repeated with the up pulse consisting of rinse water until the remaining regenerating chemical and displaced ions have been removed from the vessel. The unit can then be placed back into service to be exhausted.

The flow of water or other solution through the devices of FIGS. 1 and 3 is controlled and monitored by any conventional means available in the art. In the case of FIGS. 1 and 3, a conventional centrifugal pump (not shown) was used, but any other means may be employed, such as for example, line pressure. Similarly, the timing and sequencing for the up flow and down flow may be monitored by a conventional programmable logic controller (PLC) which is not shown.

Although the down flow pulse (or down flow) has been described as being generated using certain apparatus described above, it should be understood that any technique or process available to the art may be used. For example, in an alternative embodiment, as the initial up flow pulse exits the vessel, it enters and pressurizes a container called an accumulator which in turn produces the pressure and flow which may be used to generate the subsequent down flow or counterpulse.

Figure 4A:
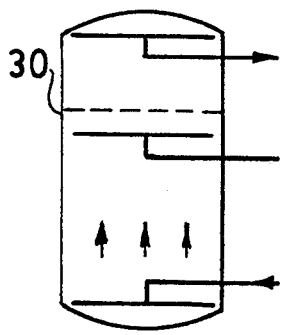
FIGS. 4A, 4B and 4C schematically illustrate a second embodiment of the present invention in the form of flow diagrams using the up flow, settle, down flow protocol.

FIG. 4A depicts the flow directions during the up flow or pulse as described in FIG. 3 above. The regenerating chemical and rinse streams are fed in pulses which proceed into the vessel through the distribution at the bottom of the vessel, up through the non-constrained resin bed, out through the top of the resin bed, through the distribution piping at the top of the system and out of the vessel.

Figure 4B:
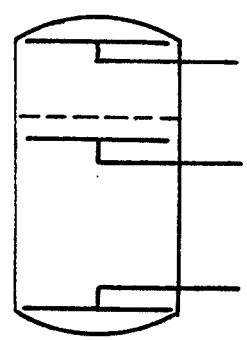

FIG. 4B depicts the non flow period during which the resin bed is allowed to partially settle.

Figure 4C:
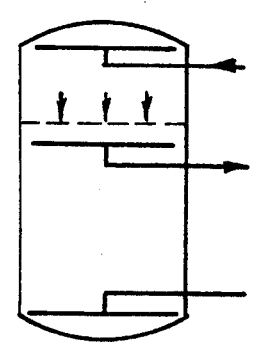

FIG. 4C depicts the flow directions during the down flow pulse (or down flow) as described for FIG. 3 above. The bed is forced to return to substantially its original position by a flow of liquid which enters the top of the vessel, passes through the distribution system at the top of the vessel, down through the top of the resin bed, and out of the vessel through the collector system located near the top of the ion exchange bed. The flow direction in FIG. 4A and 4C is illustrated by the arrows.

Figure 4D:
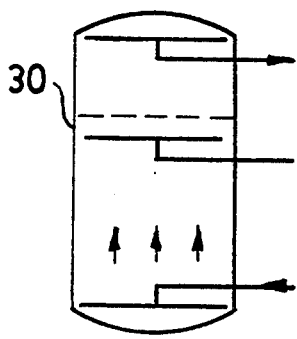
FIGS. 4D, 4E and 4F illustrate a further embodiment of the present invention in the form of flow diagrams using the up flow, down flow, settle protocol.
Figure 4E:
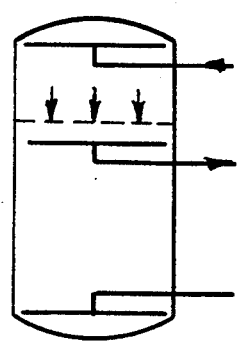
Figure 4F:
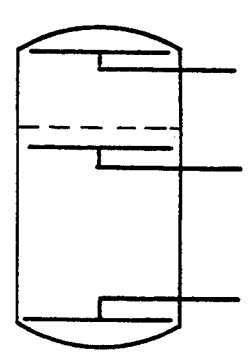

FIGS. 4D, 4E and 4F illustrate an alternative embodiment of the invention in which the sequence of the process is up flow, down flow and settle.

Figure 5:
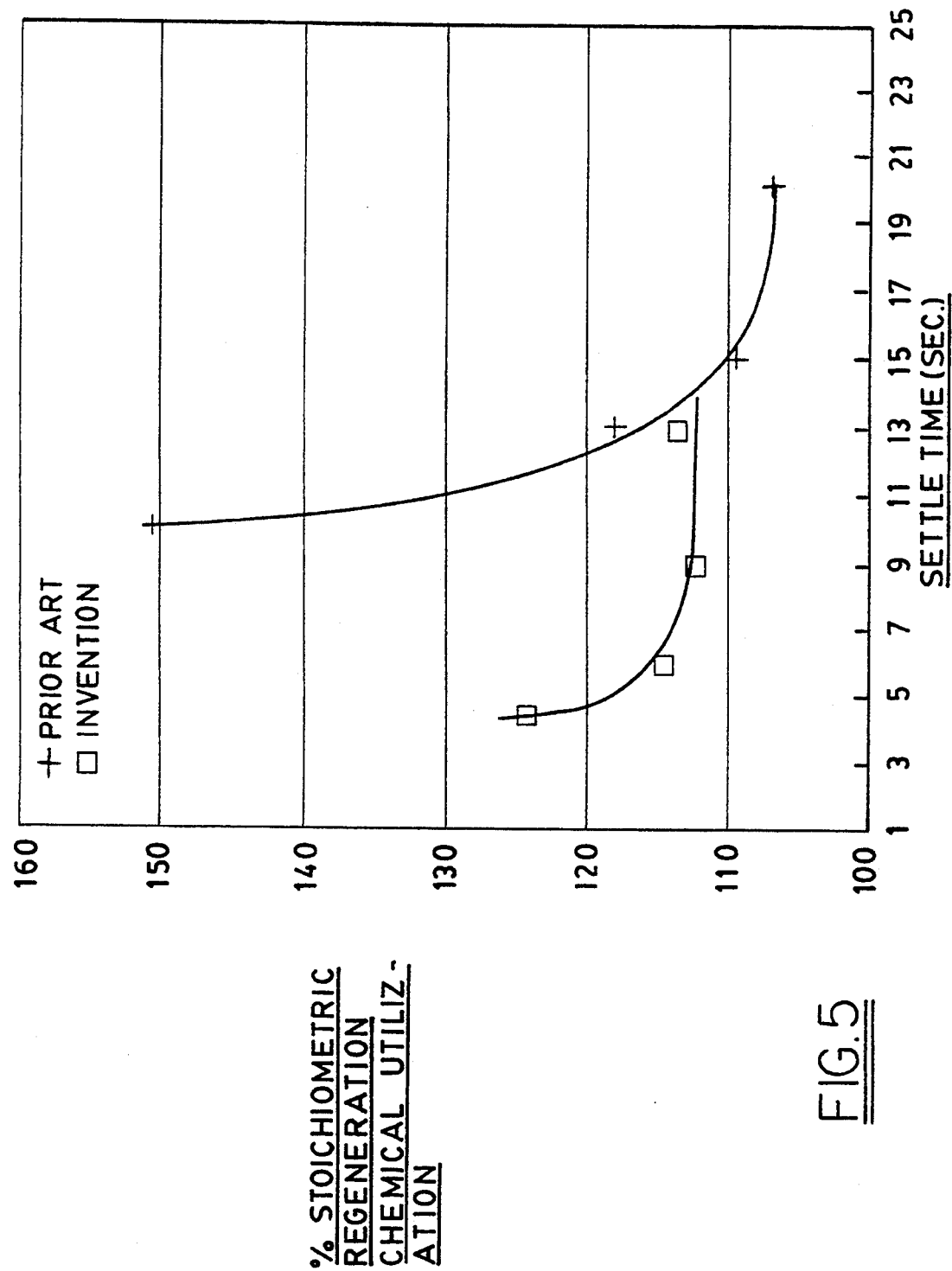
FIG. 5 is a plot of two curves illustrating the relationship between settle time and percent stoichiometric regeneration chemical utilization for the preferred embodiment of this invention (up flow, settle, down flow protocol witch the down flow exiting via a distributor in the bottom of the vessel) compared to the original Kunz process.
Figure 6:
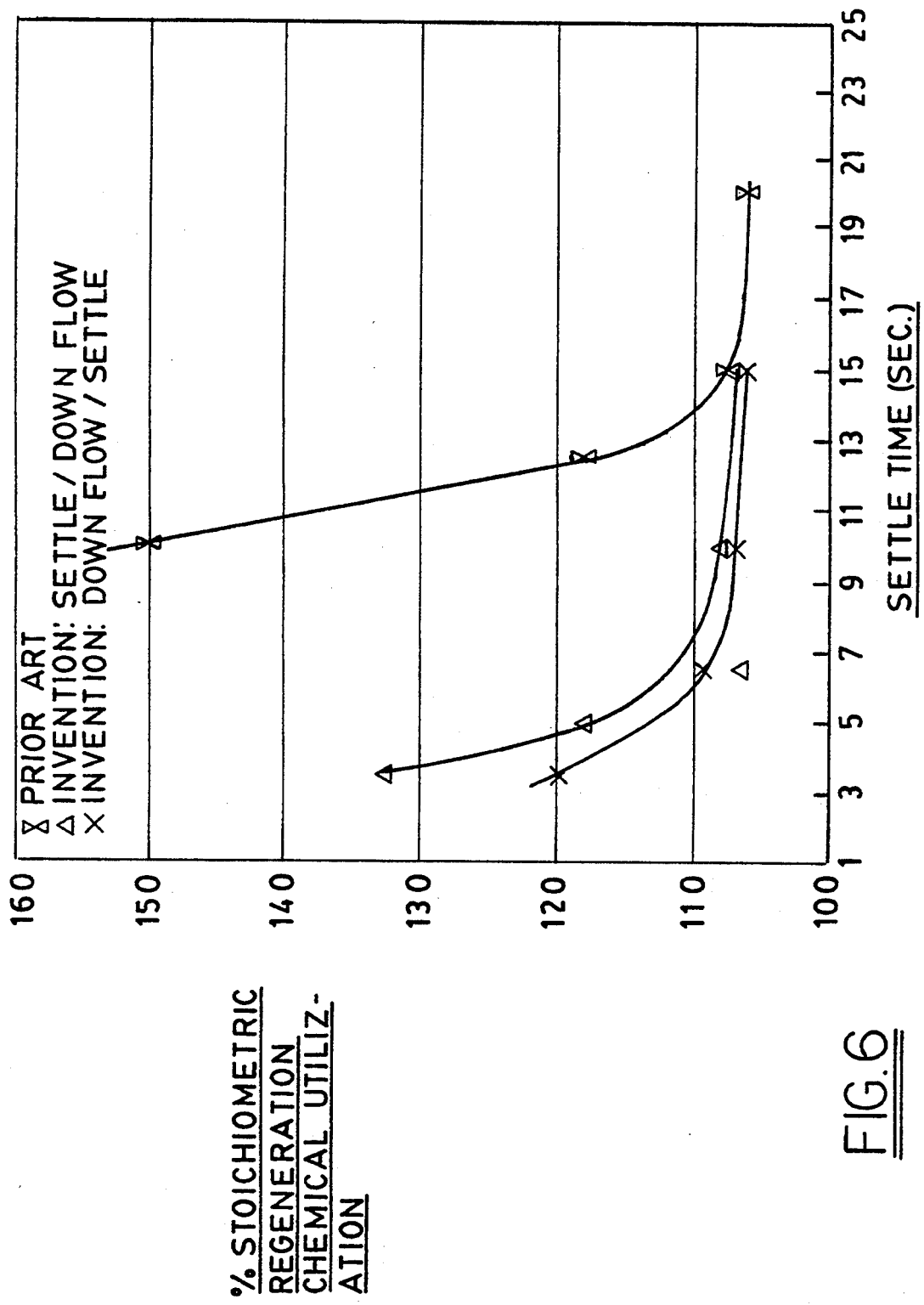
FIG. 6 is a series of curves illustrating the relationship between settle time and percent stoichiometric regeneration chemical utilization for further embodiments of the invention (up flow, down flow, settle and up flow, settle, down flow protocols with the down, flow exiting via a collector buried in the bed) compared to the original Kunz process.

The data presented in FIGS. 5 and 6 was obtained using a cation exchange resin available from Rohm and Haas under the tradename IR 120. It should be understood that any suitable cation or anion exchange resin may be used with the present invention. For example, specific reductions to practice were also made with IRA 410 and IRA 402 ion exchange resin manufactured by Rohm and Haas.

FIG. 5 is a set of two curves describing the observed relationship between the settle time allowed and the percent of stoichiometric regeneration chemical utilization in one embodiment of the present invention compared to the original Kunz process. The data was generated using a nominal one inch I.D. column, equipped as described in FIG. 1, filled to a depth of one meter with IR 120 cation exchange resin from Rohm and Haas and regenerated with a 4% solution of NaCl at a level of 3 pounds per cubic foot. Several runs were performed to establish the effect of varying settle time on the percent of stoichiometric regeneration chemical utilization for both the Kunz process and this embodiment of the present invention. The pulse or up flow volume, as described by Kunz for a vessel of the size used to generate this data was 2.1 ml which was introduced into the vessel in 2.0 sec. For the Kunz process this was then followed by a settle time of variable length. For this embodiment of the present invention the up flow pulse was followed by a settle time, whose duration was varied, and then a down flow which passed through the bed and exited via the bottom distributor. The down flow volume was 0.5 ml introduced in the vessel in 0.7 sec. This provided a net up pulse of 1.6 ml per cycle. In this embodiment of the present invention, the down flow must be smaller than the pulse or up flow in order to get a net flow through the column.

FIG. 6 is a set of curves describing the observed relationship between the settle time and percent of stoichiometric regeneration chemical utilization for a second embodiment of the invention compared to the Kunz process. The testing was done in a nominal one inch diameter glass vessel filled to a depth of one meter with IR 120 ion exchange material from Rohm and Haas and regenerated with a 4% solution of a level of 3 pounds per cubic foot with a procedure as described in FIG. 3 above. The up pulse volume, as described by Kunz for a vessel of this size, was 2.1 ml which was introduced into the vessel in 2.0 sec. For the Kunz process this was then followed by a settle time of variable length. For this second embodiment of the present invention, the up flow pulse was followed by either a down flow followed by a settle time of variable length or a settle time of variable length followed by a down flow. In both cases, the down flow volume was also 2.1 ml, but introduced in 1.5 sec. In this embodiment of the present invention, the down pulse flows through the collector located at the top of the bed and must be larger than that in the previously described embodiment in order to generate enough force to re-seat the bed effectively.

FIG. 6 contains two curves for the second embodiment. One illustrates the effect of settle time when the regeneration cycle protocol was up flow or pulse, settle, down flow; the second illustrates the effect of settle time when the regeneration cycle protocol was up flow or pulse, down flow, settle. Reversing the order of the down flow and settle time is seen to have little effect on either the overall regeneration chemical utilization or the regeneration time required for the overall process.

For FIGS. 5 and 6 the percent of stoichiometric regenerating chemical utilization is defined in the case of softening as:

$$\frac{eq.\text{NaCl used}}{eq.\text{Hardness removed}} \times 100 = \% \text{ Stoichiometric regeneration chemical utilization}$$

In other cases, the general definition is:

$$\frac{eq.\text{Regenerating agent}}{eq.\text{Ions exchanged}} \times 100 = \% \text{ Stoichiometric regeneration chemical utilization}$$

These equations describe the regeneration chemical utilization as the ratio of chemical equivalents of regenerating chemical introduced into the ion exchanger during regeneration to the chemical equivalents of all ions displaced from the ion exchange materials during regeneration. Therefore, as the percent of stoichiometric regeneration chemical utilization increases, the greater the excess chemical used in the regeneration process, with the stoichiometric (theoretical minimum) amount of regenerating chemical being used when the percent of stoichiometric regeneration chemical utilization equals 100%.

In the Kunz process, following the specified Kunz up pulse, the resin or ion exchange materials have reached velocities sufficient to create loosening of the bed but which do not result in mixing of the bed if a sufficient settle time is allowed between up pulses. According to Kunz, the only force influencing the rate of settling is the inherent effect of gravity. As the density difference between the ion exchange materials and the regeneration solution decreases, the sedimentation or settle time must be lengthened to permit the ion exchange materials to return to essentially their original position to avoid mixing.

Experimental verification of the effect of reduced settle time on regeneration chemical utilization demonstrates the deterioration of regeneration chemical utilization with insufficient sedimentation. In the case of water softening, as the Kunz process settle time is reduced from approximately 15 seconds to 11 seconds, regeneration chemical utilization as defined by Kunz, is reduced from approximately 108% to over 150% (FIG. 5).

To achieve reduced settling time and, therefore, reduced total regeneration time, requires specific control of the sedimentation process without disturbing the overall ion exchange bed or interfering with the unrestrained movement of the ion exchange material during the up flow portion of the basic Kunz process. It has been discovered that controlled down flow will dramatically assist the sedimentation process while preserving the other inherent advantages of the Kunz process. The down flow provides additional force over that provided by gravity, which can be applied at any time during the sedimentation process. In addition, tile down flow can either travel completely through the bed of ion exchange materials on through only a portion of the top of the bed and out through a collector buried at some depth from the top of the bed. In the case of down flow through the bed fluid drag forces act on the whole bed of ion exchange materials and augment gravitational forces in helping resettle the bed. When the down flow is allowed to pass through only a position of the top of the bed the drag forces act on a smaller portion of the bed while the force on the rest of the bed is limited primarily to momentum forces created by the rapid introduction of the down flow; thus larger down flow volumes are typically required when using this procedure. In both cases however, the effect of the down flow in conjunction with gravity is sufficient to dramatically reduce settle time while still allowing a net up flow through the bed to complete the regeneration process.

It has been discovered that even a small addition of down flow settling force to the gravitational resettling or sedimentation process provides significant improvement to the Kunz process. For example, in the case of water softening, the time required to regenerate a one meter bed of cation resin contained in a one inch diameter column with a 4% solution of NaCl brine at a level of 3 pounds per cubic foot using the Kunz process is approximately 2.8 hours; at these conditions the chemical utilization efficiency is 108%. Using the same up pulse conditions as Kunz but by adding a down flow of similar velocity to the Kunz pulse but whose volume is 25% to 100% to the Kunz pulse volume, both embodiments of the present invention allow regeneration in approximately 1.6 hours, at stoichiometric regeneration chemical utilizations of 112% and 108% for the preferred and second embodiments respectively, as summarized below.

TABLE I

| Method | Settle Time (Sec) | Regeneration Time (Hours) | % Stoichiometric Regeneration Chemical Utilization |
|---|---|---|---|
| Kunz | 15 | 2.9 | 108% |
| Improved Kunz (First Embodiment) | 6 | 1.6 | 108% |
| Improved Kunz (Second Embodiment) | 7 | 1.61 | 112% |

The above effect has been observed with other ion exchange materials and is generally useful across a wide range of density differences between ion exchange materials and regeneration solutions. The application of this invention is particularly useful when the density difference is small as in the case of anion exchange materials being regenerated with sodium hydroxide.

While the invention has been described in detail with respect to specific embodiments thereof, it will be understood by those skilled in the art that variations and modifications may be made without departing from the essential features thereof.

We claim:

1. A method of regenerating an ion exchanger which comprises:
   (a) providing an ion exchanger having a non-constrained bed of ion exchange material in the form of ion exchange granules;
   (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;
   (c) followed by passing a regenerating solution upwardly through the non-constrained bed of ion exchange material in a controlled intermittent pulsed flow comprising a pulsed up flow of regenerating solution, a subsequent non-flow pause time, followed by a down flow pulse in a direction opposite to the up flow, the duration and velocity of said pulsed up flow of regenerating solution being sufficient to hydrodynamically lift said ion exchange granules a controlled distance through all of the ion exchange granules without causing significant mixing of ion exchange granules throughout the concentration profile of said ion exchange material, the duration of said subsequent non-flow pause time being in the range of about 3 to 15 seconds to allow for some perceptible settling of the ion exchange granules, with said down flow pulse being sufficient to reduce the sedimentation time of said ion exchange granules to a fraction of the normal gravitational settling time for said granules in the absence of said down flow pulse.

2. The method of claim 1 where in paragraph (b) the solution being treated is an aqueous solution which is being softened or demineralized.

3. The method of claim 1 in which following the treatment with the regeneration solution, all of the steps of paragraph (c) are repeated using a rinse solution.

4. The method of claim 1 which the solution being treated in paragraph (b) is an aqueous solution.

5. A method of regenerating an ion exchanger which comprises:
   (a) providing an ion exchanger having a non-constrained bed of ion exchange material in the form of ion exchange granules, said ion exchanger being in the form of a vessel having a top distributor and a bottom distributor;
   (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;
   (c) followed by passing a regenerating solution upwardly from said bottom distributor through the non-constrained bed of ion exchange material in a controlled intermittent pulsed flow comprising a pulsed up flow of regenerating solution with said up flow exiting said vessel through said top distributor, a subsequent non-flow pause time, followed by a down flow pulse from said top distributor in a direction opposite to the up flow with said down flow pulse exiting the vessel through said bottom distributor, the duration and velocity of said pulsed up flow of regenerating solution being sufficient to hydrodynamically lift said ion exchange granules a controlled distance through all of the ion exchange granules without causing significant mixing of ion exchange granules throughout the concentration profile of said ion exchange material, the duration of said subsequent non-flow pause time being in the range of about 3 to 15 seconds to allow for some perceptible settling of the ion exchange granules, with said down flow :pulse being sufficient to reduce the sedimentation time of said ion exchange granules to a fraction of the normal gravitational settling time for said granules in the absence of said down flow pulse.

6. A method of regenerating an ion exchanger which comprises:
   (a) providing an ion exchanger having a non-constrained bed of ion exchange material in the form of ion exchange granules, said ion exchanger being in the form of a vessel having a top distributor and a bottom distributor;
   (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;

(c) followed by passing a regenerating solution upwardly from said bottom distributor through the non-constrained bed of ion exchange material in a controlled intermittent pulsed flow comprising a pulsed up flow of regenerating solution with said up flow exiting said vessel through said top distributor, followed by a down flow pulse from said top distributor in a direction opposite to the up flow, with said down flow pulse existing the vessel through said bottom distributor, and then by a subsequent non-flow pause time, the duration and velocity of said pulsed up flow of regenerating solution being sufficient to hydrodynamically lift said ion exchange granules a controlled distance through all of the ion exchange granules without causing significant mixing of ion exchange granules throughout the concentration profile of said ion exchange material, with said down flow pulse being sufficient to reduce the sedimentation time of said ion exchange granules to a fraction of the normal gravitational settling time for said granules in the absence of said down flow pulse, followed by a subsequent non-flow pause time in the range of about 3 to 15 seconds to allow for complete settling of the ion exchange granules.

7. A method of regenerating an ion exchanger which comprises:
   (a) providing an ion exchanger having a non-constrained bed of ion exchange material in the form of ion exchange granules;
   (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;
   (c) followed by passing a regenerating solution upwardly through the non-constrained bed of ion exchange material in a controlled intermittent pulsed flow comprising a pulsed up flow of regenerating solution, followed by a down flow pulse in a direction opposite to the upflow, the duration and velocity of said pulsed up flow of regenerating solution being sufficient to hydrodynamically lift said ion exchange granules a controlled distance through all of the ion exchange granules without causing significant mixing of ion exchange granules throughout the concentration profile of said ion exchange material, with said down flow pulse being sufficient to reduce the sedimentation time of said ion exchange granules to a fraction of the normal gravitational settling time for said granules in the absence of said down flow pulse, followed by a subsequent non-flow pause time in the range of about 3 to 15 seconds to allow for complete settling of the ion exchange granules.

8. The method of claim 7 where in paragraph (b) the solution being treated is an aqueous solution which is being softened or demineralized.

9. The method of claim 7 in which following the treatment with the regeneration solution, all of the steps of paragraph (c) are repeated using a rinse solution.

10. The method of claim 7 in which the solution being treated in paragraph (b) is an aqueous solution.

11. A method of regenerating an ion exchanger which comprises:
   (a) providing an ion exchanger having a non-constrained bed of ion exchange material in the form of ion exchange granules, said ion exchanger being in the form of a vessel having a top distributor and a bottom distributor and further containing a collector positioned near the top surface of the ion exchange bed;
   (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;
   (c) followed by passing a regenerating solution upwardly from said bottom distributor through the non-constrained bed of ion exchange material in a controlled intermittent pulsed flow comprising a pulsed up flow of regenerating solution with said up flow exiting said vessel through said top distributor, followed by a down flow pulse from said top distributor in a direction opposite to the up flow with said down flow pulse exiting the vessel through said collector, and then by a subsequent non-flow pause time, the duration and velocity of said pulsed up flow of regenerating solution being sufficient to hydrodynamically lift said ion exchange granules a controlled distance through all of the ion exchange granules without causing significant mixing of ion exchange granules throughout the concentration profile of said ion exchange material, with said down flow pulse being sufficient to reduce the sedimentation time of said ion exchange granules to a fraction of the normal gravitational settling time for said granules in the absence of said down flow pulse, followed by a subsequent non-flow pause time in the range of about 3 to 15 seconds to allow for complete settling of the ion exchange granules.

12. A method of regenerating an ion exchanger which comprises:
   (a) providing an ion exchanger having a non-constrained bed of ion exchange material in the form of ion exchange granules, said ion exchanger being in the form of a vessel having a top distributor and a bottom distributor and further containing a collector positioned near the top surface of the ion exchange bed;
   (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;
   (c) followed by passing a regenerating solution upwardly from said bottom distributor through the non-constrained bed of ion exchange material in a controlled intermittent pulsed flow comprising a pulsed up flow of regenerating solution with said up flow exiting said vessel through said top distributor, a subsequent non-flow pause time, followed by a down flow pulse from said top distributor in a direction opposite to the up flow, with said down flow pulse exiting the vessel through said collector, the duration and velocity of said pulsed up flow of regenerating solution being sufficient to hydrodynamically lift said ion exchange granules a controlled distance through all of the ion exchange granules without causing significant mixing of ion exchange granules throughout the concentration profile of said ion exchange material, the duration of said subsequent non-flow pause time being in the range of about 3 to 15 seconds to allow for some perceptible settling of the ion exchange granules, with said down flow pulse being sufficient to reduce the sedimentation time of said ion exchange granules to a fraction of the normal gravitational settling time for said granules in the absence of said down flow pulse.

* * * * *